May 20, 1952     A. P. AHLSTRAND     2,597,275
SPOONHOLDER
Filed Aug. 16, 1949
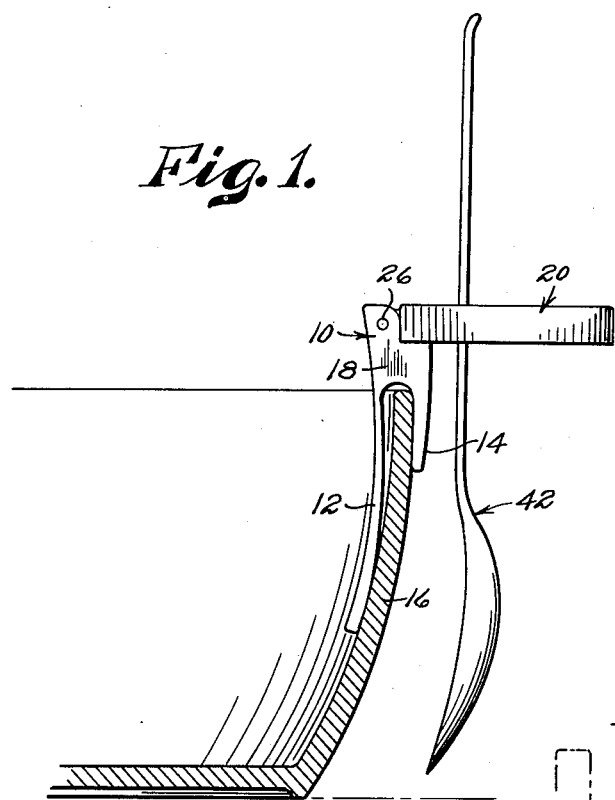
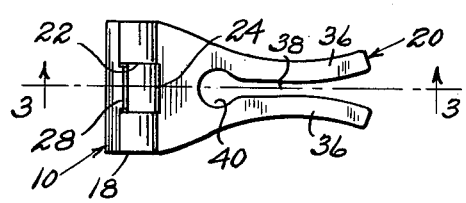
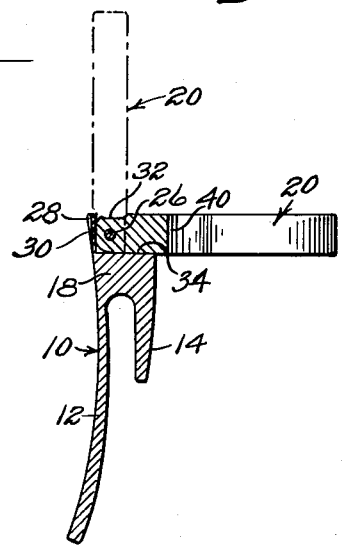
Axel P. Ahlstrand
INVENTOR
BY Victor J. Evans
&Co. ATTORNEYS Patented May 20, 1952

2,597,275

UNITED STATES PATENT OFFICE 2,597,275

SPOONHOLDER

Axel P. Ahlstrand, Worcester, Mass.

Application August 16, 1949, Serial No. 110,527

1 Claim. (Cl. 65—65)

My invention relates to spoon holders, and has among its objects and advantages the provision of an improved holder designed for mounting on a mixing bowl and the like, wherein the holder includes a pivoted fork so arranged as to hold the spoon vertically adjacent the outer wall face of the bowl when in one position, or substantially horizontally above the bowl so that drippings from the spoon may fall into the bowl when the fork is pivoted to another position.

In the accompanying drawings:

Figure 1 is a fragmentary sectional view of a bowl showing my invention applied thereto.

Figure 2 is a top view of the holder, and

Figure 3 is a sectional view along the line 3—3 of Figure 2.

In the embodiment of the invention selected for illustration, I make use of a clip 10 having fingers 12 and 14 spaced to receive the bowl wall 16 therebetween. Both fingers are formed as a unit with a head 18 to which is pivotally connected a spoon holding fork 20.

A slot 22 is made in the head for the reception of a body 24 on the fork 20, and the body is pivotally connected with the head 18 by a pin 26. A flat spring 28 is attached to the head 18 and positioned to lie in engagement with the body 24. This body is provided with flat faces 30 and 32 which respectively lie face to face with the spring 28 when the fork 20 is pivoted to its horizontal and vertical positions.

To carry the additional leverage effective on the fork 20 when in its horizontal position, the head 18 is sufficiently wide to provide a shoulder 34 constituting a rest for the fork when positioned horizontally.

The fork 20 includes two spaced fingers 36 separated by a slot 38 terminating in an opening 40 at its inner end, and the slot widens at its outer end to facilitate entry of the spoon 42. The handle 44 of the spoon passes easily through the slot 38, and the opening 40 is of such diameter that the spoon will hang through its engagement with the wall face of the opening when the handle of the spoon is turned slightly after having entered the opening, since the spoon handle widens toward its upper end.

When the fork is pivoted to its upright position, the spoon may be held in a substantially horizontal position so that the drippings may fall into the bowl.

Without further elaboration, the foregoing will so fully explain my invention, that others may, by applying current knowledge, readily adapt the same for use under various conditions of service.

I claim:

A spoon holder comprising a clip having a head portion and a pair of spaced fingers of unequal length on said head portion that are adapted to straddle the wall of a bowl so that said clip may be hung on the wall of the bowl with the longest of said fingers engaging the inner surface of the bowl, and the shortest of said fingers engaging the outer surface of the bowl, a spoon holding fork, a reduced body portion on said fork and said head portion having a slot therein to receive said reduced body portion so that a pin passed through said head portion and said reduced body portion will pivotally connect the fork to the head portion so that in a laterally projecting position of the fork the plane of the fork will be in a plane passing through the upper end of the head portion of the clip, means for respectively yieldingly holding the fork in upright and laterally projecting positions with respect to the bowl, said means comprising a spring mounted on the head of the clip at one end of the slot therein and flattened faces on the body of said fork that are adapted to coact selectively with said spring when said fork is in upright or laterally projecting position, and said fork includes a spoon receiving slot of diminishing width inwardly from one end of the fork terminating in an enlarged opening of such diameter as to bring its wall face into holding contact with a spoon handle slipped through the slot flatwise and rotated slightly when in the opening and dropped, and a shoulder portion on the clip adjacent said head portion that is adapted to support said fork when said fork is in a laterally projected position with respect to the bowl.

AXEL P. AHLSTRAND.

REFERENCES CITED

The following references are of record in the file of this patent:

UNITED STATES PATENTS

| Number | Name | Date |
|---|---|---|
| D. 69,765 | Mierow | Mar. 23, 1926 |
| 46,692 | Morse et al. | Mar. 7, 1865 |
| 148,355 | Dennett | Mar. 10, 1874 |
| 728,115 | Killey | May 12, 1903 |
| 1,182,732 | Avery | May 9, 1916 |
| 1,211,171 | Kershner | Jan. 2, 1917 |
| 1,217,373 | Wagner | Feb. 27, 1917 |
| 1,470,686 | Carpenter | Oct. 16, 1923 |
| 1,860,131 | Booth | May 24, 1932 |
| 1,916,856 | Copeman | July 4, 1933 |
| 2,406,071 | Galter | Aug. 20, 1946 |

FOREIGN PATENTS

| Number | Country | Date |
|---|---|---|
| 10,962 | Great Britain | May 10, 1907 |
| 391,131 | France | Aug. 20, 1908 |
| 428,819 | Great Britain | May 20, 1935 |